Nov. 16, 1926.
C. R. GLEASON
INSULATED CONTAINER
Filed Feb. 27, 1924
1,607,071
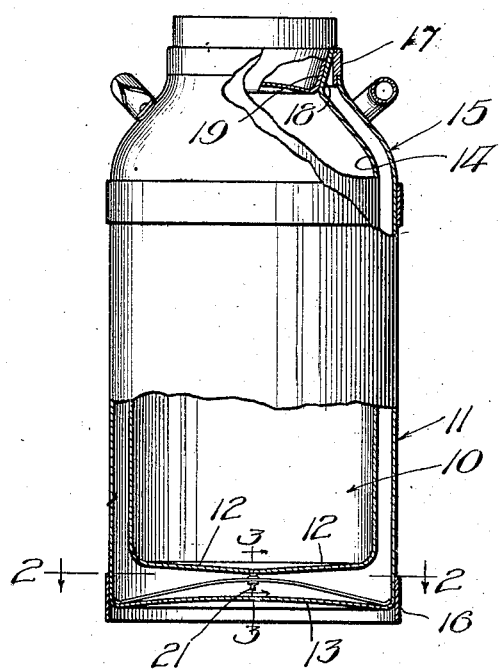
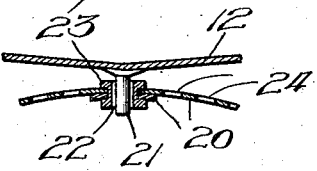
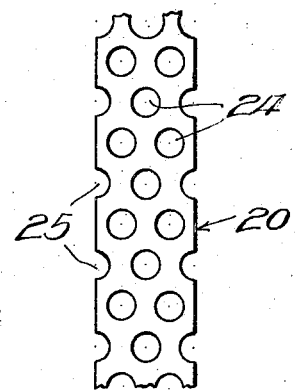
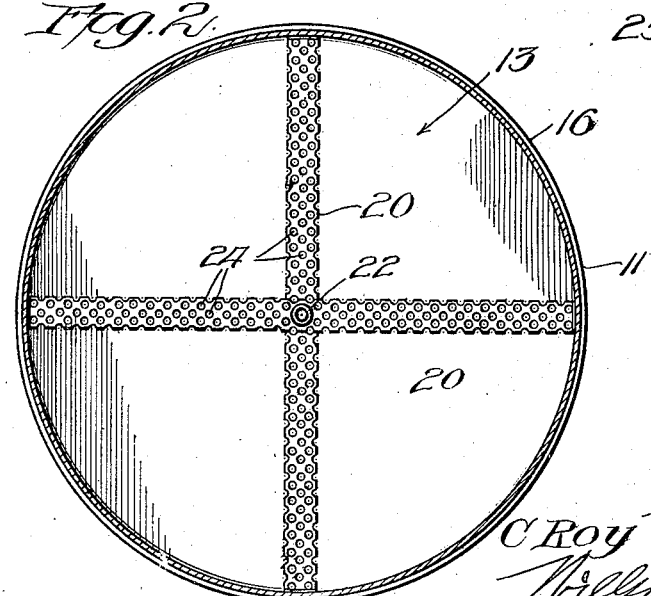
Inventor
C Roy Gleason Patented Nov. 16, 1926.

1,607,071

UNITED STATES PATENT OFFICE.

C ROY GLEASON, OF CHICAGO, ILLINOIS.

INSULATED CONTAINER.

Application filed February 27, 1924. Serial No. 695,403.

This invention relates to improvements in insulating receptacles of that type comprising an inner and an outer shell, with a space between them that is exhausted and sealed to maintain a high vacuum or otherwise insulated so as to thereby insulate the contents of the receptacle from the surrounding air, whether said contents be warmer or cooler than the surrounding air.

The invention is herein shown as embodied in a vacuum insulated milk can of that type illustrated in my prior United States Letters Patent No. 1,437,647, granted December 5th, 1922.

In receptacles of this character, and especially in long receptacles, such as milk cans, wherein the inner shell is suspended from the upper end of the outer shell or a part supported thereon, it is difficult to avoid pendulum swing of the inner shell in a way tending to fracture the connection between said inner shell and its top support.

It is the purpose of the present invention to provide a brace between the lower ends of the inner and outer shells of a character which possesses low thermal conductivity to transmit heat from one shell to the other across the insulating space between them, and which will hold the inner shell from such pendulum motion and thereby avoid destructive stresses at the top connection between the inner shell and the outer shell from whence the inner shell is suspended.

Other purposes of the invention will appear as the description proceeds, and the invention consists in the combination and arrangement of the parts shown in the drawings and described in the specification, and is pointed out in the appended claims.

In the drawings:

Figure 1 is a view partly in side elevation and partially in vertical section of a vacuumized milk can embodying my invention.

Figure 2 is an enlarged horizontal section on the line 2—2 of Figure 1.

Figure 3 is a detail on the line 3—3 of Figure 1.

Figure 4 is an enlarged detail of one of the brace bars.

As shown in the drawings, the body of the can comprises an inner shell 10 and an outer shell 11, both herein shown as made cylindric. Said shells are formed with integral bottoms 12 and 13, respectively, and comprise at their upper ends curved breast sections 14 and 15, respectively. Said breast sections may be made parts separate from the inner and outer shells and welded or otherwise joined thereto. The can may be supported on a base ring 16.

The manner of connecting the inner shell to and suspending it from the outer shell follows the general construction in my aforesaid prior Patent No. 1,437,647, granted on the 5th day of December, 1922. It consists, as shown, of a relatively massive ring 17, the lower margin of which is rebated for the reception of the upper edge of the breast section 15 and is welded thereto to form a flush joint; the tapered neck of the inner breast section being fitted with and brazed in a rebate at the inner side of the upper edge of said ring. The top opening of the can surrounded by said neck is closed by a suitable cover 19, which is shown as tapered to fit within said outwardly tapered neck portion 18. These features of the construction, in themselves, constitute no part of the invention and may be otherwise designed.

20, 20 designate brace bars preferably made of thin metal or other rigid material. They intersect at the axial center of the can and are fixed together at said intersection in any suitable manner, as by brazing. The intersection of said brace bars is disposed in the axis of the can and the ends of the brace bars abut the junction of the bottom and upright walls of the outer shell.

The inner shell 10 is provided with a depending coaxial tip or lug 21, which extends a distance below the bottom wall thereof. The brace bars 20 are provided at their point of intersection with an opening 22 to receive said lug 21. Preferably said opening is of a diameter to loosely receive said tip, so that when the shells are concentric there will be no contact between the tip and the wall of said opening; but contact of said tip with said wall, upon small decentration of the shells, will limit pendulum movement of the inner shell.

As herein shown, the opening 22 is formed in a nipple 23 that is supported by and is fixed to said brace bars at their intersection. Said nipple is headed at one end for engagement with one side of the intersecting braces and is adapted to be flanged over the other side of said braces to hold it in place. The said nipple 23 is preferably made of a material possessing lower thermal conductivity than the brace bars 20. Said brace bars may be made of relatively light steel and the nipple 23 may be made of asbestos, rubber, bakelite or similar substances.

In accordance with another phase of the invention, the said brace bars are so formed as to limit heat conductivity, as compared to their cross-sectional mass, and to thereby slow down tendency of transmission of heat from one shell to the other through the insulating space in which said braces are located. This may be effected by forming said brace bars with a plurality of apertures 24 and side notches 25. These apertures are formed partly in the body of the braces and partly at their edges and are staggered both laterally and longitudinally in such a way that the conductive path of heat from end to end thereof is elongated relatively to the total length of the braces. This construction and arrangement gives to the braces a low co-efficiency of heat conduction, with an ample bracing strength to the bars, and, so far as the broader phase of the invention is concerned, the brace members may be otherwise constructed. The arrangement herein shown, whereby two braces are employed, which intersect and are fastened to each other at their point of intersection, and which abut at their outer ends against the outer shell structure, is a desirable one, inasmuch at it provides a rigid brace structure with a moderate thickness of material and, being located within the insulating space, serves to very materially insulate one shell from the other.

In accordance with a further phase of the invention the said brace bars are upwardly curved from their outer ends to their point of intersection, being highest at the latter point, where the centering stud 21 co-acts therewith. This curved or arched arrangement has the effect of further strengthening the brace structure as a whole.

The formation of the brace structure by intersecting elements has the advantage of producing a very light but efficient brace. This and other details of the construction may be somewhat varied from the illustrated embodiment within the scope of the appended claims, it being the intent to claim all of inherent novelty herein disclosed.

I claim as my invention:—

1. An insulating container comprising inner and outer shells, separated by an insulating barrier, with means to suspend the inner shell from the outer shell at the top of the container, and a brace structure for the inner shell supported on the outer shell, the brace structure being perforated at numerous points to reduce the heat conductivity thereof.

2. An insulating container comprising inner and outer shells, separated by an insulating barrier, with means to suspend the inner shell from the outer shell at the top of the container, and a perforated brace structure for the inner shell within the space occupied by said barrier, comprising bars which intersect and are connected to the inner shell centrally thereof and abut said outer shell, the bars being perforated at many points to reduce the heat conductivity thereof.

3. An insulating container comprising inner and outer shells, separated by an insulating barrier, with means to suspend the inner shell from the outer shell at the top of the container, and a fixed brace structure between the bottoms of said shells comprising crossed bars fixed together at their point of crossing, said bars being curved upwardly from their abutting ends to their point of crossing, said bars being out of contact with the inner container and there being an antipendulum connection between said inner shell and the points of crossing of said bars.

4. An insulating container comprising inner and outer shells, separated by an insulating barrier, with means to suspend the inner shell from the outer shell at the top of the container, and a fixed brace structure between the bottoms of said shells comprising perforated crossed bars fixed together at their point of crossing, said bars being curved upwardly from their abutting ends to their point of crossing, said bars being out of contact with the inner container and there being an antipendulum connection between said inner shell and the points of crossing of said bars.

5. An insulating container comprising inner and outer shells, separated by an insulating barrier, with means to suspend the inner shell from the outer shell at the top of the container, a brace structure between the bottoms of said shells comprising fixed bars crossing each other and there apertured, and a stud projecting from the inner shell and entering said apertures, said bars being perforated, with the perforations staggered transversely and longitudinally of the bars.

6. A vacuum container comprising inner and outer shells separated by a vacuumized space, with means permanently to fasten the inner shell to the outer shell at the top of the container and suspended therefrom, and a device located between the bottom of the inner shell and the outer shell and normally out of contact with one of the shells, for preventing objectionable swinging movements of the inner shell relatively to the outer shell.

7. A vacuum container comprising inner and outer shells separated by a vacuumized space, with means permanently to fasten the inner shell to the outer shell at the top of the container and suspended therefrom, a device located between the bottom of the inner shell and the bottom of the outer shell and normally out of contact with one of said shells, said device having an opening therein, and a part smaller than the opening projecting into the latter from the latter shell to limit relative swinging movements of the shells.

In witness whereof I claim the foregoing as my invention, I hereunto append my signature this 16th day of February, 1924.

C ROY GLEASON.